(12) United States Patent
Haase et al.

(10) Patent No.: US 11,211,630 B2
(45) Date of Patent: Dec. 28, 2021

(54) HOUSING FOR A FUEL CELL STACK AND METHOD OF PRODUCING SAME

(71) Applicant: Bayerische Motoren Werke Aktiengesellschaft, Munich (DE)

(72) Inventors: Stefan Haase, Munich (DE); Fabian Heining, Bad Neustadt (DE); Lukas Wittchen, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 619 days.

(21) Appl. No.: 15/403,217

(22) Filed: Jan. 11, 2017

(65) Prior Publication Data
US 2017/0125834 A1 May 4, 2017

Related U.S. Application Data

(63) Continuation of application No. PCT/EP2015/068731, filed on Aug. 14, 2015.

(30) Foreign Application Priority Data

Aug. 28, 2014 (DE) ..................... 10 2014 217 220.9

(51) Int. Cl.
*H01M 8/2475* (2016.01)
*H01M 8/248* (2016.01)
(Continued)

(52) U.S. Cl.
CPC ....... *H01M 8/2475* (2013.01); *H01M 8/2404* (2016.02); *H01M 8/248* (2013.01); *H01M 8/2485* (2013.01)

(58) Field of Classification Search
None
See application file for complete search history.

(56) References Cited

U.S. PATENT DOCUMENTS

2003/0203270 A1 10/2003 Rock
2006/0194094 A1 8/2006 Evertz et al.
(Continued)

FOREIGN PATENT DOCUMENTS

DE 10 2004 037 678 A1 3/2006
DE 10 2010 051 748 A1 5/2012
(Continued)

OTHER PUBLICATIONS

Chinese-language Office Action issued in counterpart Chinese Application No. 201580026751.3 dated Aug. 2, 2018 with English translation (13 pages).
(Continued)

*Primary Examiner* — Haixia Zhang
(74) *Attorney, Agent, or Firm* — Crowell & Moring LLP

(57) ABSTRACT

A housing is provided for a fuel cell stack. The housing includes two end plates, two opposite side walls, a lateral connecting wall, and at least one media exchange element. The two end plates are arranged at the two ends of the fuel cell stack. The two opposite side walls connect the end plates to each other. The lateral connecting wall connects the opposite side walls to each other. The at least one media exchange element has media connections. At least the two end plates are each designed as an extruded supporting structure. The media connections are not fed across the end plates.

11 Claims, 3 Drawing Sheets

(51) Int. Cl.
*H01M 8/2485* (2016.01)
*H01M 8/2404* (2016.01)

(56) References Cited

U.S. PATENT DOCUMENTS

| | | | |
|---|---|---|---|
| 2007/0248855 | A1 | 10/2007 | Reinert |
| 2013/0260275 | A1* | 10/2013 | Ichihara ............... H01M 8/249 429/458 |
| 2014/0356753 | A1 | 12/2014 | Guenthart et al. |
| 2016/0013508 | A1* | 1/2016 | Martinchek ......... H01M 8/2475 429/469 |
| 2016/0087297 | A1* | 3/2016 | Hood ............... H01M 8/04029 429/422 |

FOREIGN PATENT DOCUMENTS

| | | |
|---|---|---|
| EP | 2 658 023 A1 | 10/2013 |
| JP | 7-732348 A | 2/1995 |
| JP | 9-92324 A | 4/1997 |
| JP | 2003-112551 A | 4/2003 |
| JP | 2004-319346 A | 11/2004 |
| JP | 2005-522857 A | 7/2005 |
| JP | 2007-261345 A | 10/2007 |
| JP | 2011-198538 A | 10/2011 |
| JP | 2012-86344 A | 5/2012 |
| WO | WO 03/094275 A1 | 11/2003 |
| WO | WO 2004/075330 A1 | 9/2004 |
| WO | WO 2006/104442 A1 | 10/2006 |
| WO | WO 2008/089977 A1 | 7/2008 |
| WO | WO 2013/104395 A1 | 7/2013 |

OTHER PUBLICATIONS

German-language Search Report issued in counterpart German Application No. 10 2014 217 220.9 dated Aug. 4, 2015 with partial English translation (10 pages).
International Search Report (PCT/ISA/210) issued in PCT Application No. PCT/EP2015/068731 dated Nov. 2, 2015 with English translation (5 pages).
German-language Written Opinion (PCT/ISA/237) issued in PCT Application No. PCT/EP2015/068731 dated Nov. 2, 2015 (6 pages).
Cover page of EP 1 597 790 A1 published Nov. 23, 2005 (one (1) page).
Japanese Office Action issued in Japanese counterpart application No. 2016-575662 dated Jun. 25, 2019, with partial English translation (Seven (7) pages).
Japanese Office Action issued in Japanese counterpart application No. 2016-575662 dated Dec. 25, 2019, with partial English translation (Four (4) pages).

* cited by examiner

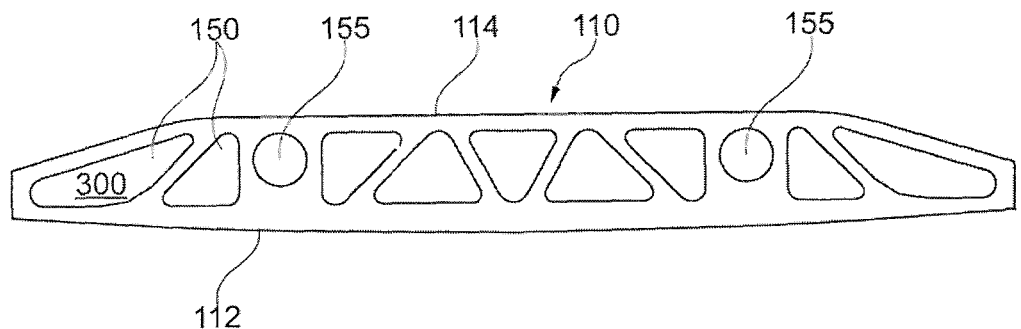
Fig. 2
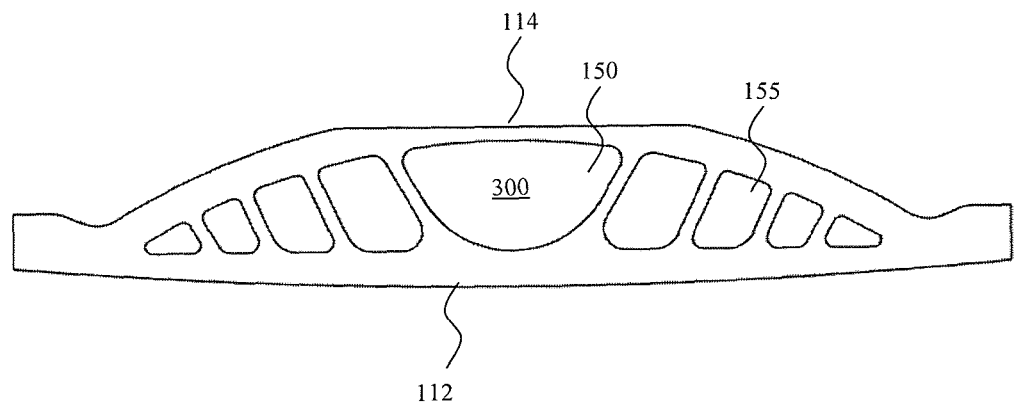
Fig. 3
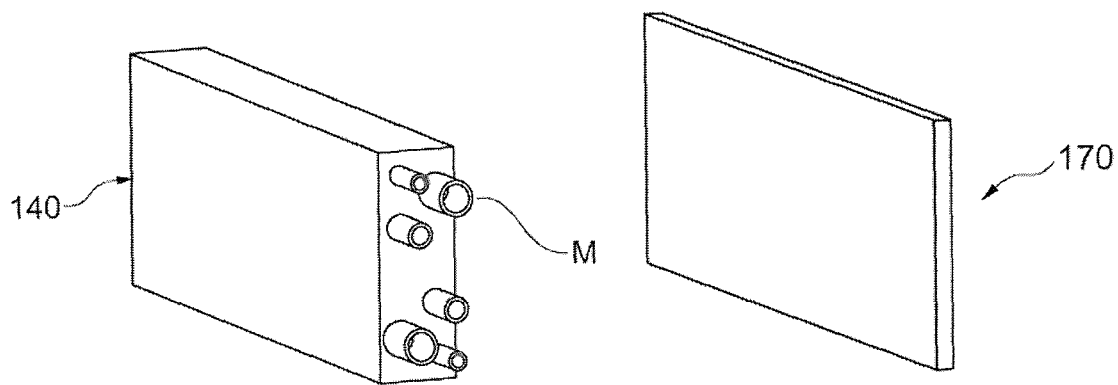
Fig. 4
Fig. 5

HOUSING FOR A FUEL CELL STACK AND METHOD OF PRODUCING SAME

CROSS REFERENCE TO RELATED APPLICATIONS

This application is a continuation of PCT International Application No. PCT/EP2015/068731, filed Aug. 14, 2015, which claims priority under 35 U.S.C. §119 from German Patent Application No. 10 2014 217 220.9, filed Aug. 28, 2014, the entire disclosures of which are herein expressly incorporated by reference.

BACKGROUND AND SUMMARY OF THE INVENTION

The present invention relates to a housing for a fuel cell stack.

WO03/094275 A1 discloses a fuel cell stack having end plates to which side plates are welded. EP1597790 B1 discloses an end plate for a stack of fuel cells having a curved pressure shield.

It is a preferred object of the technology disclosed herein to reduce or eliminate the disadvantages of the previously known fuel cell stack housing solutions. There is further a need to provide a comparatively compact housing, which reliably clamps the individual fuel cells of the fuel cell stack, with a small weight and volume and any length tolerances. There is further a need to provide a housing with good or improved thermal and/or electrical insulation. There is also a need to provide a cost-effective fuel cell system.

This and other objects are achieved by a housing for a fuel cell stack, comprising: two end plates which are arranged at the two ends of the fuel cell stack; two opposing side walls which connect the end plates to each other; a lateral connecting wall which connects the opposing side walls to each other; and at least one media exchange element having media connections, wherein the two end plates are constructed as an extruded carrier structure, and further wherein the media connections are not guided transversely through the end plates.

As noted above, the technology disclosed herein relates to a housing for a fuel cell stack. The housing comprises two end plates which are arranged at the two ends of the fuel cell stack. The housing further comprises two opposing side walls which connect the end plates to each other.

In particular, the end plates are connected to each other in such a manner that the fuel cells of the fuel cell stack arranged between the end plates are clamped. The housing disclosed herein further comprises a lateral connecting wall which at least partially connects the opposing side walls to each other. The connections of the side walls, the connecting wall and the end plates to each other is preferably such that the connection(s) are fluid-tight.

The housing may include at least one media exchange element having media connections. The media exchange element may be integrated in one or both end plate(s). Furthermore, a separate media exchange element may alternatively or additionally be arranged between the end plates and the fuel cell stack.

The two end plates may be constructed as an extruded carrier structure. A carrier structure is a supporting framework having a plurality of walls or rods which are arranged at an angle relative to each other in cross section and which connect to each other the outer contours of the carrier structure which are spaced apart from each other. Such a carrier structure has a higher level of rigidity than a component which includes only the two outer walls which are positioned directly one on the other and which are not spaced apart from each other.

The end plates disclosed herein may be constructed as an extruded carrier structure. The construction as an extruded element allows cost-effective production of the end plates which are then generally comparatively light and torsion-resistant.

The housing may include, in particular, a media exchange element having media connections which are not guided transversely through the external outer contours or faces of the end plate. This means that the media connections are not guided out through the end plates to any additional lines but instead at a lateral opening of the housing.

The media connections are particularly advantageously guided out on the connection side of the housing. The connection side of the housing is preferably arranged opposite the connecting wall. All the media connections are preferably guided out only on the connection side. Advantageously, the connection side can also be closed by a plate-like wall. Consequently, there is disclosed a housing which is surrounded on all sides and in which the media connections are guided out laterally only on one side.

The housing disclosed herein is comparatively light and torsion-resistant and may further protect the fuel cell against mechanical influences. The housing is preferably comparatively fluid-tight.

The opposing side walls and/or the lateral connecting wall preferably also have a carrier structure. Advantageously, the outer walls of the carrier structure of the side walls and/or the lateral connecting wall are spaced apart from each other to a lesser extent than the outer walls of the two end plates. In other words, the end plate has a carrier structure which is more torsionally resistant than the carrier structure of the side walls and/or the lateral connection wall, whereby a weight reduction of the side walls and the connection wall can be achieved.

If the media element is constructed separately, it is advantageously constructed as a substantially planar plate which is suitable for transmitting the surface pressure applied by the end plates uniformly to the fuel cell stack or any other components.

Insulation layers and current collectors are preferably arranged between the end plates. For example, an insulation layer may be integrated in a media connection or media exchange element or it may act as an insulation layer. Furthermore, the at least one carrier structure in the end plates, the opposing side walls and/or the lateral connecting wall preferably includes at least one recess which is accessible from the outer side or at least one opening which is accessible from the outer side. The recess or the opening may be constructed to receive at least one system component of the fuel cell system.

A system component is, for example, a component which is necessary for operating the fuel cell system. Such system components are, for example, components which are arranged in the high-voltage region of the fuel cell. For example, such system components include the Balance of Plant (BoP) components. Such elements are, for example, the recirculation pump H2 or the Cell Voltage Monitor.

The carrier structure of the end plates, the opposing side walls and/or the lateral connecting wall preferably has at least one media channel. The media channel is preferably constructed to produce a fluid connection between the fuel cell stack and at least one fluid line which adjoins the housing. For example, the media channels may ensure the supply of the fuel cell with fuel, for example, hydrogen, and oxidation agents, for example, atmospheric oxygen. Furthermore, for example, cooling fluid can be introduced and discharged through the media channels. The media channels may be arranged in different carrier structures of different end plates or side walls.

The integration of such system components and/or such media channels in the extruded profiles allows a compact system construction with comparatively rigid and light components which can further be produced in a comparatively cheap manner.

The at least one end plate may have in cross section a convex or outwardly curved outer contour. The outer contour may have such dimensions that it becomes deformed during the clamping of the fuel cell stack. In particular, it may already be deformed during the welding operation, in particular in such a manner that the outer contour is at least partially positioned in a planar manner on the adjacent component which is located between the two end plates. The adjacent component is, for example, an insulation layer or plate, a media exchange element, a fuel cell stack, etc. As a result of this bulging or convex construction of the internal outer contour, preferably as a 2D curvature, the clamping force which clamps the fuel cell stack is applied uniformly at least partially, preferably over the entire support face. In a particularly preferable manner, consequently, an approximately homogeneous pressing pressure can be applied to the fuel cell stack as a result of the bulging of the end plate. The pressing pressure may be applied either directly to the fuel cell stack or indirectly, for example, via a media exchange element which is constructed in a plate-like manner. Instead of an extrusion profile, it is also contemplated to have an end plate which is produced with the die-casting method. However, such a plate would not be as inexpensive to produce as an extruded end plate.

The opposing side walls and the end plate are preferably welded to each other in such a manner that the fuel cells of the fuel cell stack are or become clamped. The lateral connecting wall is also preferably welded to the end plates.

The opposing side walls and the lateral connecting wall are preferably constructed integrally and/or in a U-shaped manner. Such a preformed semi-finished product may have, for example, a U-shaped plate. Such a semi-finished product may further simplify the production and may result in more compact housings. Preferably, the at least one carrier structure of the end plates, the opposing side walls and/or the lateral connecting wall is formed so as to run out in the direction toward the connection regions. Such a run-out form means that the outer walls of the carrier structure extend toward each other in the direction toward the connection region and merge one into the other in the connection region. Such a configuration can be welded particularly well.

A method for producing the housing preferably includes the following steps:
providing a fuel cell stack in a press;
clamping the fuel cell stack in the press;
welding at least two opposing side walls to two end plates, wherein the end plates are arranged at the upper end and lower end of the fuel cell stack, and wherein the side walls are arranged laterally with respect to the fuel cell stack.

In other words, a method for producing a housing having a fuel cell stack includes the following:
providing two extruded end plates which are arranged at the two ends of the fuel cell stack and which have a carrier structure;
providing two opposing side walls which connect the end plates to each other in the assembled state;
providing a lateral connection wall which connects the opposing side walls to each other; and
providing a fuel cell stack, wherein the fuel cell stack is clamped to the end plates, and the two opposing side walls are welded to the lateral end plates.

After the welding operation, the pressing force of the pressing tool can then be reduced and the housing with the clamped fuel cell stack can be removed. Preferably, the curved outer contour of the inner side of the end plates becomes deformed during the reduction of the pressing force on a planar force application to the fuel cells. The method according to the invention may further include the step of assembling at least one system component of the fuel cell system in at least one accessible recess or an accessible opening of a carrier structure.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2 and 3 are schematic cross sections of an end plate 110.

FIG. 4 is a perspective view of a media exchange element 140.

FIG. 5 is a perspective view of an insulation plate 170.

DETAILED DESCRIPTION OF THE DRAWINGS

Figure 1:
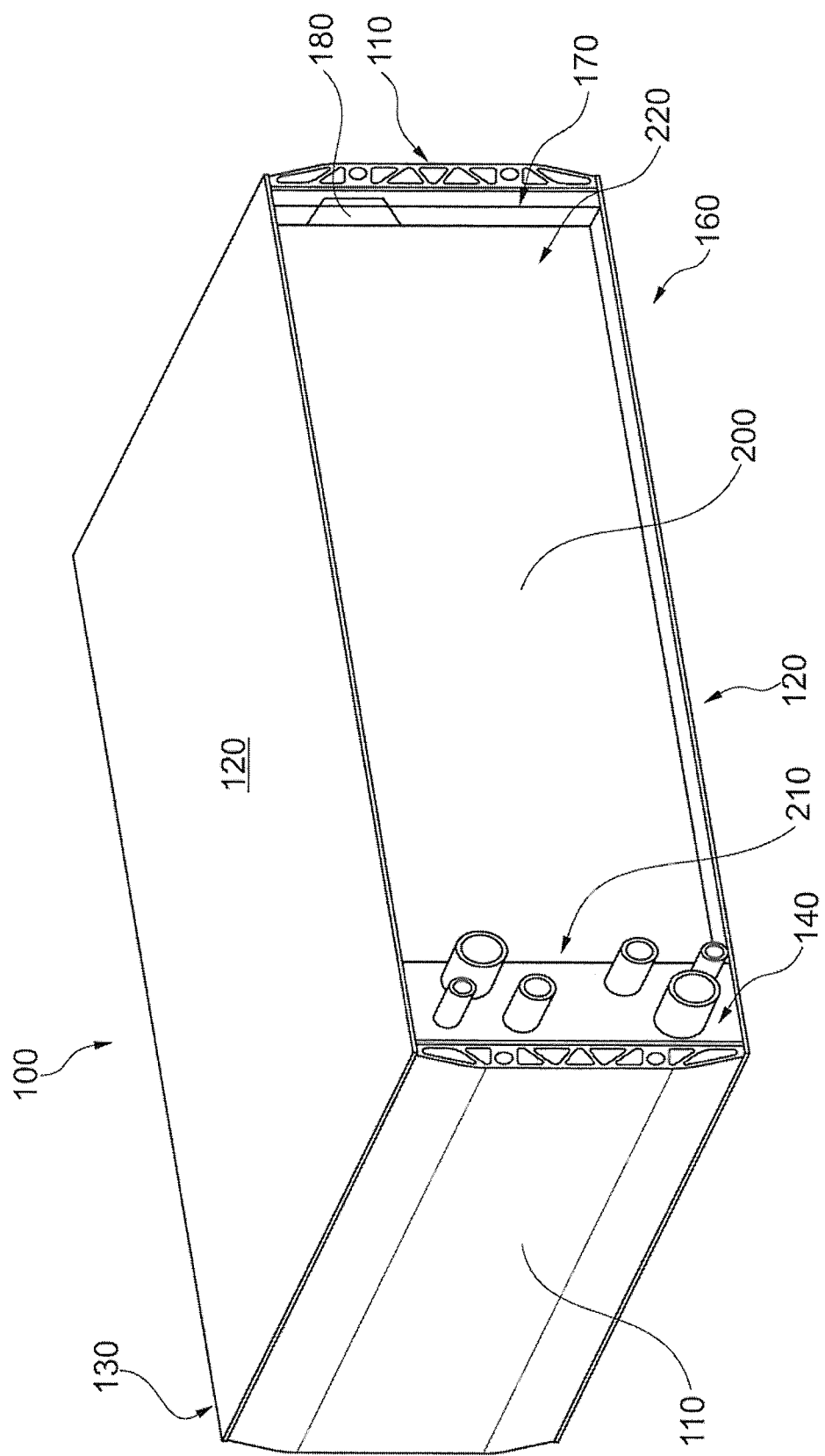
FIG. 1 is a schematic perspective view of a fuel cell housing 100 with a fuel cell stack 200.

FIG. 1 is a perspective view of the housing 100 which is disclosed herein. The end plates 110 are arranged in this case at the head of the fuel cell stack 200, that is to say, at the ends 210 and 220 of the fuel cell stack 200. Here, the end plates 110 clamp an assembly comprising the following elements: fuel cell stack 200, media exchange element 140 with media connections M and insulation plate 170. In this case, it is only possible to see one current collector 180. However, two current collectors 180 are guided out of the fuel cell stack 200 on the connection side 160. The two end plates 110 are each welded to the opposing side walls 120 and the lateral connecting wall 130.

In this instance, a positive-locking and a non-positive-locking connection may exist. The end plates 110 are constructed as an extruded profile in this instance. Alternatively or additionally, it is also possible to use die-cast profiles or multiple-layer plates, for example, with aluminum foam. Such multiple-layer plates are, for example, sandwich constructions, in which the two outer layers 112, 114 (see FIGS. 2 and 3) are also spaced apart from each other. The die-casting method is associated with comparatively high production costs, but provides a higher level of construction freedom during the construction of the components.

The operational components 300 which are integrated in the end plates are not illustrated in greater detail. The end plates 110, the opposing side walls 120 and/or the lateral connecting wall 130 are preferably produced from aluminum. Plastic material is preferably used as the insulation and/or sealing material.

The end plate 110 is preferably constructed in a bulging or convex manner (cf. FIGS. 2 and 3) at least on the inner side or lower side 112. Preferably, the end plate 110 has a curvature only in cross section and not in a/an (extrusion) longitudinal direction. Such a configuration of the end plate 110 facilitates the production with the extrusion method. Since the clamping forces are substantially introduced into the end plate 110 through the weld seam in the connection region in a planar manner via an entire longitudinal side, such a two-dimensional curvature is also suitable for transmitting the clamping forces in a planar manner to the components 140, 200, 170 arranged between the end plates 110. The end plate 110 is bent under the pressure loading as a result of the clamping at the edge region. The proportion of the bending precisely corresponds to the bulging applied so that the end plate 110 thereby becomes flat and can transmit the applied pressure homogeneously to the adjacent components. Adjacent components are, for example, the media exchange plate 140 or the insulation plate 170.

Instead of a media exchange plate 140, the media supply M may also be provided in the end plate(s) 110. For example, channels 155 which are provided to this end in the extrusion profile can be drilled or milled transversely to the extrusion direction. Alternatively, the end plates 110 can be produced with the die-casting method.

FIGS. 2 and 3 are cross-sectional views through end plates 110. There are illustrated here, for example, accessible recesses or openings 150, in which system components 300 can be integrated. There is further shown a media channel 155 which is suitable for conveying a fluid from a fluid line (not illustrated) to an element of the fuel cell stack 200. In this instance, additional sealing devices may be provided, for example, between the fluid and end plate 110, for example, plastic inserts. The outer contours 112 and 114 are spaced apart from each other at least in the central region by a carrier structure. The outer contours 112, 114 converge toward each other toward the lateral ends. The rigidity of the component 110 increases with the increased spacing in the central region of the end plate 110 illustrated here. Since the framework or supporting framework or carrier structure has a large number of recessed regions 150, 155 between the walls, the weight of the end plate 110 is comparatively small. At the same time, that structural space 150 is used for system components 300, for example, BoP components 300. The media connections 155 are not guided transversely through the end plates 110. This means that the outer contour 114, that is to say, the contour which is arranged on the side facing away from the fuel cell stack 200, is not interrupted by a media connection 155. In other words, the curved outer contour 114 is non-interrupted. Such a component 110 has a particularly high level of rigidity with a comparatively small weight. Any milled grooves which connect the media channels 155 to any connections of the fuel cell stack 200 are not illustrated in FIG. 2.

FIG. 4 shows a plate-like configuration of a separate media exchange element 140. All the media connections M are constructed toward one side. Such a configuration of the housing 100 simplifies the assembly or disassembly of the housing 100 on the vehicle. FIG. 5 shows a plate-like insulator 170.

Figure 6:
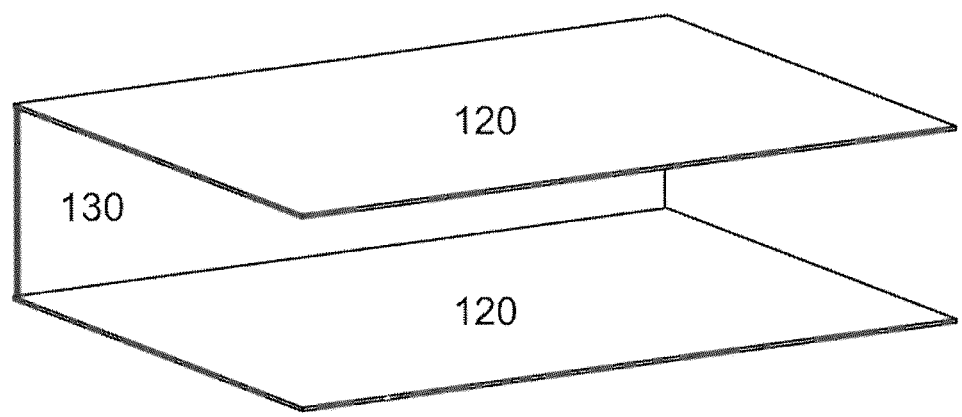
FIGS. 6 to 8 are perspective views of the side walls 120 and the lateral connecting wall 130.

FIG. 6 shows opposing side walls 120 and a lateral connecting wall 130. The three elements 120, 130 are assembled here as U-shaped semi-finished products. Preferably, the elements are produced from aluminum or magnesium. The configuration shown here may, for example, be produced from a plate material with a bending method. Alternatively, three individual plates may also be assembled.

Figure 7:
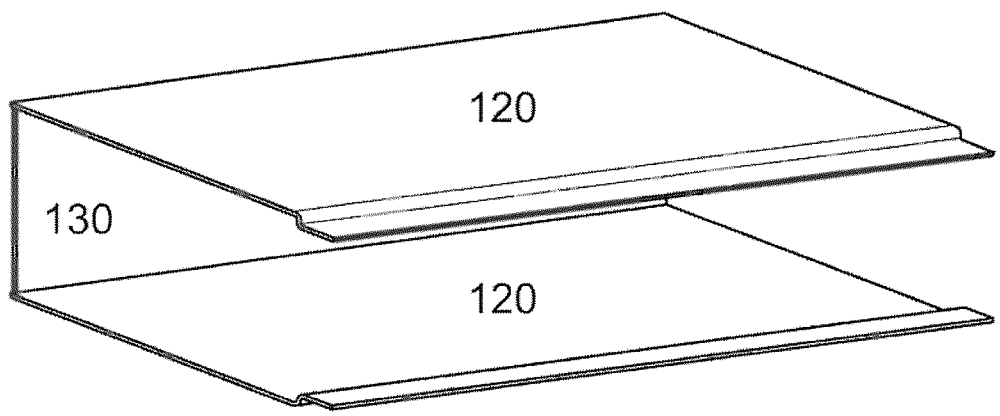

FIG. 7 also shows a U-shaped semi-finished product, in which the opposing side walls 120 have a small bend or fold at the front edge. Such a bend can further rigidify the component and make it easier to fit it to the vehicle. Otherwise, the U-shaped semi-finished product can be constructed identically as in FIG. 6.

Figure 8:
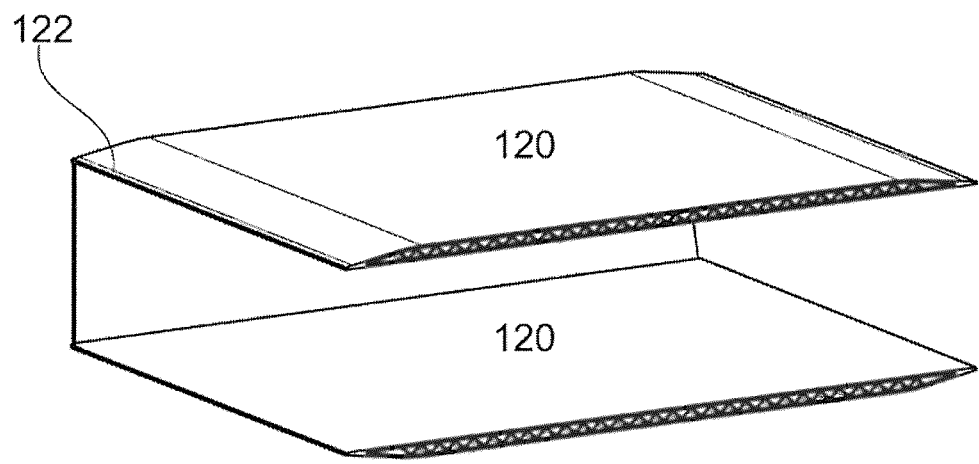

FIG. 8 shows another configuration of the U-shaped semi-finished product in which at least the opposing side walls 120 have a rigidified geometry. For rigidification, a carrier structure is provided here in the opposing side walls 120. The rigidification serves to reduce the torsion loading which acts on the fuel cell stack 200. For retention of the housing 100, anchor locations may be provided in a state distributed in a planar manner on the end plates 110 or on the opposing side walls 120. Alternatively and/or additionally, retention locations may be provided in the bent region (cf. FIG. 7).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A housing for a fuel cell stack, the housing comprising:
   two end plates arranged at two ends of the fuel cell stack, wherein each of the end plates is constructed as an extrudable carrier structure comprising:
   spaced apart opposing outer walls including a first outer wall having a first surface configured to face the fuel cell stack as interposed between the fuel cell stack and a second outer wall opposite the first outer wall, and
   a supporting framework arranged between and connecting the outer walls, wherein the supporting framework includes a plurality of internal walls or rods angularly arranged relative to each other such that, when viewed from a cross-section of the respective end plate taken substantially perpendicular to the outer walls, the internal walls or rods angularly project from the first outer wall to the second outer wall;
   two opposing side walls that connect the two ends plates to each other;
   a lateral connecting wall that connects the two opposing side walls to each other; and
   at least one media exchange element having media connections, wherein the media connections are not guided transversely through any of the two end plates.

2. The housing according to claim 1, wherein the media connections are guided out of the housing on a connection side, the connection side being arranged opposite the lateral connecting wall.

3. The housing according to claim 1, wherein the two opposing side walls are constructed as a carrier structure.

4. The housing according to claim 3, wherein the lateral connecting wall is constructed as a carrier structure.

5. The housing according to claim 1, wherein the lateral connecting wall is constructed as a carrier structure.

6. The housing according to claim 1, wherein the plurality of internal walls or rods and the outer walls of the carrier structure define a plurality of recesses or openings within the carrier structure, and at least one of the plurality of recesses or openings is configured to receive a system component of a fuel cell system having the fuel cell stack.

7. The housing according to claim 1, wherein the plurality of internal walls or rods and the outer walls of the carrier structure define a media channel within the carrier structure, and the media channel is configured to produce a fluid connection between the fuel cell stack and a fluid line adjoining the housing.

8. The housing according to claim 1, wherein at least one of the two end plates has, in cross-section, a convex outer contour dimensioned such that it deforms during clamping of the fuel cell stack so that the outer contour is at least partially positioned in a planar manner on an adjacent component.

9. The housing according to claim 1, wherein the two opposing side walls and the two end plates are welded to each other such that fuel cells of the fuel cell stack are clamped in the housing.

10. The housing according to claim 1, wherein the two opposing side walls and the lateral connecting wall are constructed integrally to have a U-shaped cross-section.

11. The housing according to claim 4, wherein the outer walls of the carrier structure of the two end plates, outer walls of the carrier structure of the two opposing side walls, and/or outer walls of the carrier structure of the lateral connecting wall run out in a direction toward a respective connection region of the respective outer walls.

* * * * *